United States Patent
Kniffen et al.

(10) Patent No.: US 10,510,231 B2
(45) Date of Patent: *Dec. 17, 2019

(54) MOVING OBJECT DETECTION, TRACKING, AND DISPLAYING SYSTEMS

(71) Applicant: INNOVATIVE SIGNAL ANALYSIS, INC., Richardson, TX (US)

(72) Inventors: Stacy K. Kniffen, Richardson, TX (US); Daniel P. Gibbs, Murphy, TX (US); Weldon T. Bailey, Wylie, TX (US); Mark J. Hillebrand, Garland, TX (US); Stephen R. Erbert, Rowlett, TX (US)

(73) Assignee: Innovative Signal Analysis, Inc., Richardson, TX (US)

( * ) Notice: Subject to any disclaimer, the term of this patent is extended or adjusted under 35 U.S.C. 154(b) by 591 days.

This patent is subject to a terminal disclaimer.

(21) Appl. No.: 15/216,813

(22) Filed: Jul. 22, 2016

(65) Prior Publication Data

US 2016/0328932 A1    Nov. 10, 2016

Related U.S. Application Data

(63) Continuation of application No. 12/908,281, filed on Oct. 20, 2010, now Pat. No. 9,430,923.
(Continued)

(51) Int. Cl.
*G06F 3/0482* (2013.01)
*G08B 13/194* (2006.01)
(Continued)

(52) U.S. Cl.
CPC ......... *G08B 13/194* (2013.01); *G06F 3/0482* (2013.01); *G06F 3/04847* (2013.01);
(Continued)

(58) Field of Classification Search
None
See application file for complete search history.

(56) References Cited

U.S. PATENT DOCUMENTS 3,816,741 A   6/1974   Macall
3,978,281 A   8/1976   Burrer
(Continued)

FOREIGN PATENT DOCUMENTS

GB    2239762 B    3/1994

OTHER PUBLICATIONS

Prosecution history from U.S. Appl. No. 12/908,281, including: Non-Final Rejection dated Mar. 22, 2013, Amendment filed Aug. 22, 2013, Final Rejection dated Dec. 31, 2013, Amendment and RCE filed Mar. 18, 2014, Non-Final Rejection dated Apr. 15, 2014, Amendment filed May 27, 2014, Final Rejection dated Jun. 9, 2014, Response After Final filed Jul. 1, 2014. Advisory Action dated Jul. 28, 2014 (continued on NPL2).
(Continued)

*Primary Examiner* — Jennifer N To
*Assistant Examiner* — Joseph R. Burwell
(74) *Attorney, Agent, or Firm* — Kelly, Holt & Christenson PLLC

(57) ABSTRACT

An alert and tracking system implemented on a computing device with a processor is presented. The system comprises a display with a viewing portion and a raster portion comprising a plurality of rasters. The system also comprises an image receiver configured to receive a first image and a second image, wherein the first image is received before the second image is received. The system also comprises a processing unit. The processing unit is configured to receive the second image. The processing unit is also configured to compare the second image to the first image. The processing unit is also configured to detect a change between the second
(Continued)

image and the first image, wherein the detected change is indicative a moving object. The processing unit is also configured to update the viewing portion to display the second image. The processing unit is also configured to update the raster portion, wherein updating the raster image comprises adding a new raster to the plurality of rasters, wherein the new raster comprises a row of pixels corresponding to a compressed view of the image.

22 Claims, 8 Drawing Sheets

Related U.S. Application Data

(60) Provisional application No. 61/265,156, filed on Nov. 30, 2009.

(51) Int. Cl.
*G06F 3/0484* (2013.01)
*G06F 3/0485* (2013.01)
*G06T 7/246* (2017.01)

(52) U.S. Cl.
CPC .......... *G06F 3/04855* (2013.01); *G06T 7/248* (2017.01); *G06F 2203/04806* (2013.01); *G06T 2207/10016* (2013.01); *G06T 2207/30232* (2013.01); *G06T 2207/30241* (2013.01)

(56) References Cited

U.S. PATENT DOCUMENTS

| | | | |
|---|---|---|---|
| 4,043,672 A | 8/1977 | Baumgartner |
| 5,022,723 A | 6/1991 | Schmidt et al. |
| 5,149,969 A | 9/1992 | Fouilloy et al. |
| 5,339,188 A | 8/1994 | Fritzel |
| 5,610,730 A | 3/1997 | Osipchuk |
| 5,721,585 A | 2/1998 | Keast et al. |
| 5,870,220 A | 2/1999 | Migdal et al. |
| 5,923,365 A | 7/1999 | Tamir et al. |
| 6,034,716 A | 3/2000 | Whiting et al. |
| 6,064,423 A | 5/2000 | Geng |
| 6,081,278 A | 6/2000 | Chen |
| 6,147,701 A | 11/2000 | Tamura et al. |
| 6,195,609 B1 | 2/2001 | Pilley et al. |
| 6,226,035 B1 | 5/2001 | Korein et al. |
| 6,304,284 B1 | 10/2001 | Dunton et al. |
| 6,335,758 B1 | 1/2002 | Ochi et al. |
| 6,356,296 B1 | 3/2002 | Driscoll, Jr. et al. |
| 6,373,508 B1 | 4/2002 | Moengen |
| 6,421,185 B1 | 7/2002 | Wick et al. |
| 6,456,232 B1 | 9/2002 | Milnes et al. |
| 6,654,063 B1 | 11/2003 | Tadatsu |
| 6,665,003 B1 | 12/2003 | Peleg et al. |
| 6,717,608 B1 | 4/2004 | Mancuso et al. |
| 6,734,808 B1 | 5/2004 | Michaelson et al. |
| 6,738,073 B2 | 5/2004 | Park et al. |
| 6,744,403 B2 | 6/2004 | Milnes et al. |
| 6,757,446 B1 | 6/2004 | Li et al. |
| 6,765,566 B1 | 7/2004 | Tsao |
| 6,795,113 B1 | 9/2004 | Jackson et al. |
| 6,798,923 B1 | 9/2004 | Hsieh et al. |
| 6,831,693 B1 | 12/2004 | Sunaga |
| 6,909,438 B1 | 6/2005 | White et al. |
| 6,927,905 B1 | 8/2005 | Kashitani et al. |
| 6,975,353 B1 | 12/2005 | Milinusic et al. |
| 7,058,239 B2 | 6/2006 | Singh et al. |
| 7,092,132 B2 | 8/2006 | Matsuda |
| 7,136,096 B1 | 11/2006 | Yamagishi et al. |
| 7,206,017 B1 | 4/2007 | Suzuki |
| 7,245,744 B2 | 7/2007 | Kaneko et al. |
| 7,256,834 B1 | 8/2007 | Sagefalk et al. |
| 7,260,241 B2 | 8/2007 | Fukuhara et al. |
| 7,301,557 B2 | 11/2007 | Kakou et al. |
| 7,489,330 B2 | 2/2009 | Hayashi et al. |
| 7,495,694 B2 | 2/2009 | Cutler |
| 7,528,864 B2 | 5/2009 | Sassa |
| 7,583,815 B2 | 9/2009 | Zhang et al. |
| 7,660,439 B1 | 2/2010 | Lu et al. |
| 7,710,463 B2 | 5/2010 | Foote |
| 7,801,328 B2 | 9/2010 | Au et al. |
| 7,801,330 B2 | 9/2010 | Zhang et al. |
| 7,884,848 B2 | 2/2011 | Ginther |
| 7,911,517 B1 | 3/2011 | Hunt et al. |
| 8,072,482 B2 | 12/2011 | Gibbs et al. |
| 8,099,201 B1 | 1/2012 | Barber et al. |
| 8,511,606 B1 | 8/2013 | Lutke et al. |
| 8,521,339 B2 | 8/2013 | Gariepy et al. |
| 8,670,020 B2 | 3/2014 | Gibbs et al. |
| 8,792,002 B2 | 7/2014 | Gibbs et al. |
| 8,803,972 B2 | 8/2014 | Gibbs et al. |
| 9,413,956 B2 | 8/2016 | Gibbs et al. |
| 2001/0005218 A1 | 6/2001 | Gloudemans et al. |
| 2002/0024599 A1 | 2/2002 | Fukuhara et al. |
| 2002/0054211 A1 | 5/2002 | Edelson et al. |
| 2002/0071122 A1 | 6/2002 | Kulp et al. |
| 2002/0109772 A1 | 8/2002 | Kuriyama et al. |
| 2002/0126226 A1 | 9/2002 | Dudkowski |
| 2002/0196962 A1 | 12/2002 | Fukuhara et al. |
| 2003/0142203 A1 | 7/2003 | Kawakami et al. |
| 2003/0171169 A1 | 9/2003 | Cavallaro et al. |
| 2004/0021766 A1 | 2/2004 | Daniilidis et al. |
| 2004/0022453 A1 | 2/2004 | Kusama et al. |
| 2004/0061774 A1 | 4/2004 | Wachtel et al. |
| 2005/0029458 A1 | 2/2005 | Geng et al. |
| 2005/0031204 A1 | 2/2005 | Kaneko et al. |
| 2005/0259146 A1 | 11/2005 | Berdugo |
| 2005/0259158 A1 | 11/2005 | Jacob et al. |
| 2006/0017816 A1 | 1/2006 | Gat |
| 2006/0023074 A1 | 2/2006 | Cutler |
| 2006/0069497 A1 | 3/2006 | Wilson, Jr. |
| 2006/0072020 A1 | 4/2006 | McCutchen |
| 2006/0227997 A1 | 10/2006 | Au et al. |
| 2006/0265109 A1 | 11/2006 | Canu-Chiesa et al. |
| 2006/0268102 A1 | 11/2006 | Ginther |
| 2006/0283317 A1 | 12/2006 | Melnychuk et al. |
| 2007/0140427 A1 | 6/2007 | Jensen et al. |
| 2007/0248285 A1* | 10/2007 | Lippincott ............... G06K 9/32 382/298 |
| 2008/0068451 A1 | 3/2008 | Hyatt |
| 2008/0088719 A1 | 4/2008 | Jacob et al. |
| 2008/0166015 A1 | 7/2008 | Haering et al. |
| 2008/0185526 A1 | 8/2008 | Horak et al. |
| 2008/0219509 A1 | 9/2008 | White et al. |
| 2008/0252527 A1 | 10/2008 | Garcia |
| 2008/0263592 A1 | 10/2008 | Kimber et al. |
| 2008/0291279 A1 | 11/2008 | Samarasekera et al. |
| 2009/0087029 A1 | 4/2009 | Coleman et al. |
| 2009/0223354 A1 | 9/2009 | Root, Jr. |
| 2009/0260511 A1 | 10/2009 | Melnychuk et al. |
| 2010/0002082 A1 | 1/2010 | Buehler et al. |
| 2010/0013926 A1 | 1/2010 | Lipton et al. |
| 2010/0026802 A1 | 2/2010 | Titus et al. |
| 2010/0045799 A1* | 2/2010 | Lei et al. ............... H04N 5/225 348/169 |
| 2010/0073460 A1 | 3/2010 | Gibbs et al. |
| 2010/0073475 A1 | 3/2010 | Gibbs et al. |
| 2010/0128110 A1 | 5/2010 | Mavromatis |
| 2010/0156630 A1 | 6/2010 | Ainsbury |
| 2010/0228406 A1 | 9/2010 | Hamke et al. |
| 2011/0081043 A1 | 4/2011 | Sabol et al. |
| 2011/0150272 A1 | 6/2011 | GunasekaranBabu et al. |
| 2011/0169867 A1 | 7/2011 | Kniffen et al. |
| 2011/0299733 A1 | 12/2011 | Jahangir et al. |
| 2012/0120189 A1 | 5/2012 | Gibbs et al. |
| 2014/0316614 A1 | 10/2014 | Newman |
| 2014/0320595 A1 | 10/2014 | Gibbs et al. |
| 2014/0327733 A1 | 11/2014 | Wagreich |

(56) References Cited

U.S. PATENT DOCUMENTS

2015/0248584 A1    9/2015   Greveson et al.
2015/0346722 A1   12/2015   Herz et al.

OTHER PUBLICATIONS

Amendment Submitted/Entered with Filing of CPA/RCE (Sep. 9, 2014), Non-Final Rejection dated Oct. 22, 2014, Amendment filed Jan. 22, 2015, Non-Final Rejection dated May 15, 2015, Amendment filed Aug. 3, 2015, Final Rejection dated Nov. 19, 2015. 221 pages, Amendment and RCE filed Feb. 17, 2016, and Notice of Allowance dated Apr. 25, 2016.

Hampapur et al., "Smart Video Surveillance", IEEE Signal Processing Magazine, pp. 38-51, Mar. 2005.

Girgensohn et al. "DOTS: Support for Effective Video Surveillance", ACM Multimedia 2007, pp. 423-432, Sep. 2007.

Khoshabeh et al., "Multi-Camera Based Traffice Flow Characterization & Classification", Proceedings of the 2007 IEEE Intelligent Transportation Conference, pp. 259-264, Sep. 2007.

Pham et al., "A Multi-Camera Visual Surveillance System for Tracking of Reoccurrences of People", First ACM/IEEE International Conference on Distributed Smart Cameras (ICDSC '07), pp. 164-169, Sep. 2007.

Saleemi et al., "Probabilistic Modeling of Scene Dynamics for Applications in Visual Surveillance", IEEE Transactions on Pattern Analysis and Machine Intelligence, v. 31, n. 8, pp. 1472-1485, Aug. 2009.

USDOT, Transview (TV32) Installation and Operations Guide for Maritime Safety and Security Information System (MSSIS), Version 7.7.4B, revision 1, Jun. 18, 2009.

Zhang et al., "Ship Tracking Using Background Subtraction and Inter-frame Correlation", 2nd International Congress on Image and Signal Processing (CISP '09), pp. 1-4, Oct. 17, 2009.

Chen et al., "A Trajectory-Based Ball Tracking Framework with Visual Enrichment for Broadcast Baseball Videos", Journal of Information Science and Engineering, v. 24, pp. 143-157, 2008.

Kasi et al., "Yet Another Algorithm for Pitch Tracking", IEEE International Conference on Acoustics, Speech, and Signal Processing (ICASSP), v. 1, pp. 361-364, May 2002.

Whiting, "Science lesson for baseball", SFGate.com, Sep. 19, 2009.

Assfalg et al., "Semantic annotation of soccer videos: automatic highlights identification", Computer Vision and Image Understanding, v. 92, pp. 285-305, 2003.

Cavallaro, "The FoxTrax Hockey Puck Tracking System". IEEE Computer Graphics and Applicaitons, pp. 6-12, Mar.-Apr. 1997.

D'Orazio et al., "A Visual system for real time detection of goal events during soccer matches", Computer Vision and Image Understanding, v. 113, pp. 622-632, 2009.

Figueroa et al., "Tracking soccer players aiming their kinematic motion analysis", Computer Vision and Understanding, v. 101, pp. 122-135, 2006.

Khatoonabadi et al. "Automatic soccer players tracking in goal scenes by camera motion elimination", Image and Vision Computing, v. 27, pp. 469-479, 2009.

Liu et al., "Extracting 3D information from broadcast soccer video", Image and Vision Computing , v. 24, pp. 1146-1162, 2006.

Liu et al., "Automatic player detection, labeling and tracking in broadcast soccer video", Pattern Recognition Letters, v. 30, pp. 103-113, 2009.

Pallavi et al., "Ball detection from broadcast soccer videos using static and dynamic features", Journal of Visual Communication and Image Representation, v. 19, n. 7, pp. 426-436, Oct. 2008.

Piciarelli et al, "On-line trajectory clustering for anomalous events detection", Pattern Recognition Letters, v. 27, pp. 1835-1842, 2006.

Xie et al, "Structure analysis of soccer video with domain knowledge and hidden Markov models", Pattern Recognition Letters, v. 25, pp. 767-775, 2004.

Zhang et al., "People detection in low-resolution video with non-stationary background", Image and Vision Computing, v. 27, pp. 437-443, 2009.

Zhu et al., "Trajectory Based Events Tactics Analysis in Broadcast Sports Video", Proceedings of the 15th International Conference on Multimedia, pp. 58-67, 2007.

Prosecution history from U.S. Appl. No. 14/314,646, including: Requirement for Election/ Restriction dated Aug. 12, 2015, Response to Restriction Requirement filed Oct. 12, 2015, and non-final Rejection dated Dec. 30, 2015. 18 pages.

Durucan, Emrullah, "Change Detection and Background Extraction by Linear Algebra", Proceedings of the IEEE vol. 89, No. 10, Oct. 2001, pp. 1368-1381.

Blair, Brian J. "The Laser Imaging Sensor: a medium altitude, digitization-only, airborne laser altimeter for mapping vegetation and topography", ISPRS Journal for Photogrammetry & Sensing 54 (1999), pp. 115-122.

Prosecution History for U.S. Appl. No. 14/830,990 including: Non-Final Office Action dated Mar. 28, 2016 Non-Final Office Action dated Sep. 21, 2016, Amendment dated Jun. 3, 2016, Application and Drawings filed Aug. 20, 2015.

Prosecution History for U.S. Appl. No. 14/630,900 including: Final Office Action dated Nov. 2, 2017, Amendment dated Aug. 1, 2017, Non-Final Office Action dated May 5, 2017, Amendment After Final dated Mar. 30, 2017, Final Office Action dated Jan. 30, 2017, and Amendment dated Dec. 20, 2017, 83 pages.

Prosecution History for U.S. Appl. No. 14/314,646 including Issue Notification dated Jul. 20. 2016, Notice of Allowance dated Apr. 8, 2016, and Amendment dated Mar. 25, 2016, 15 pages.

\* cited by examiner

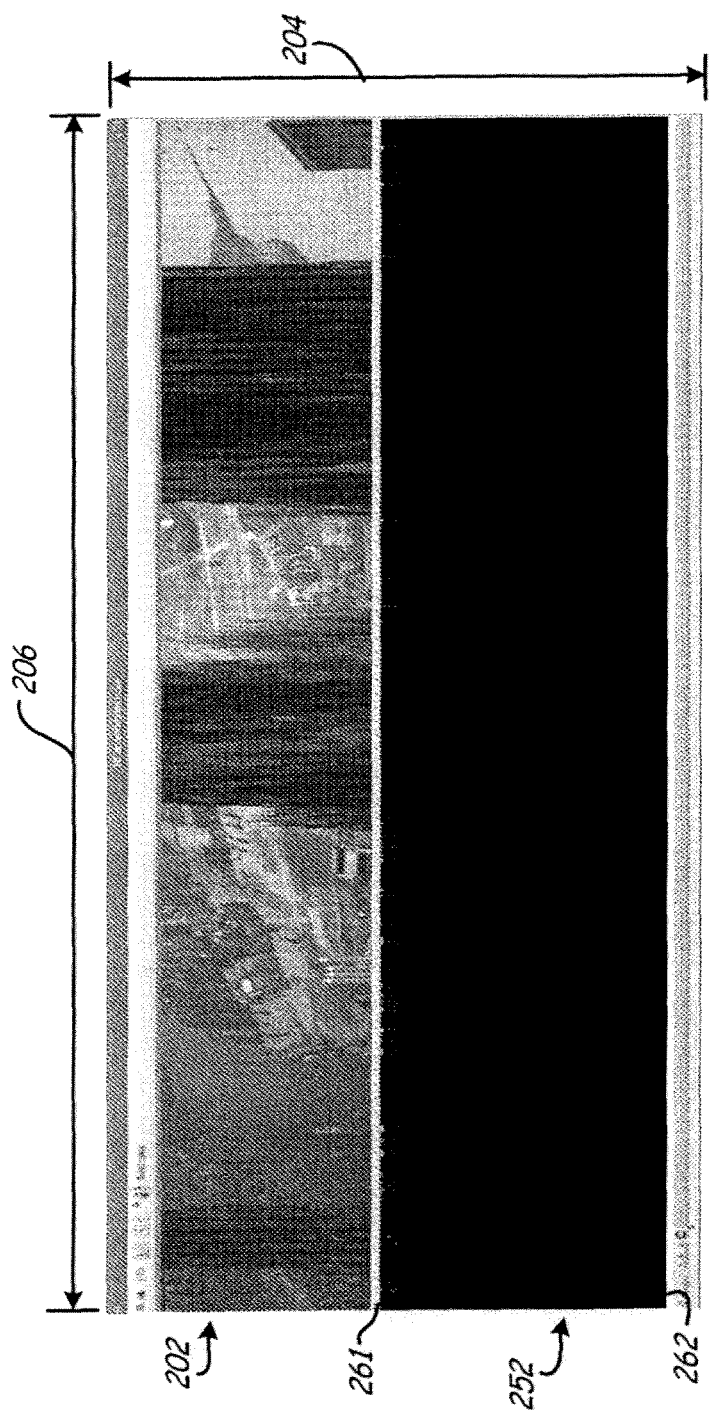

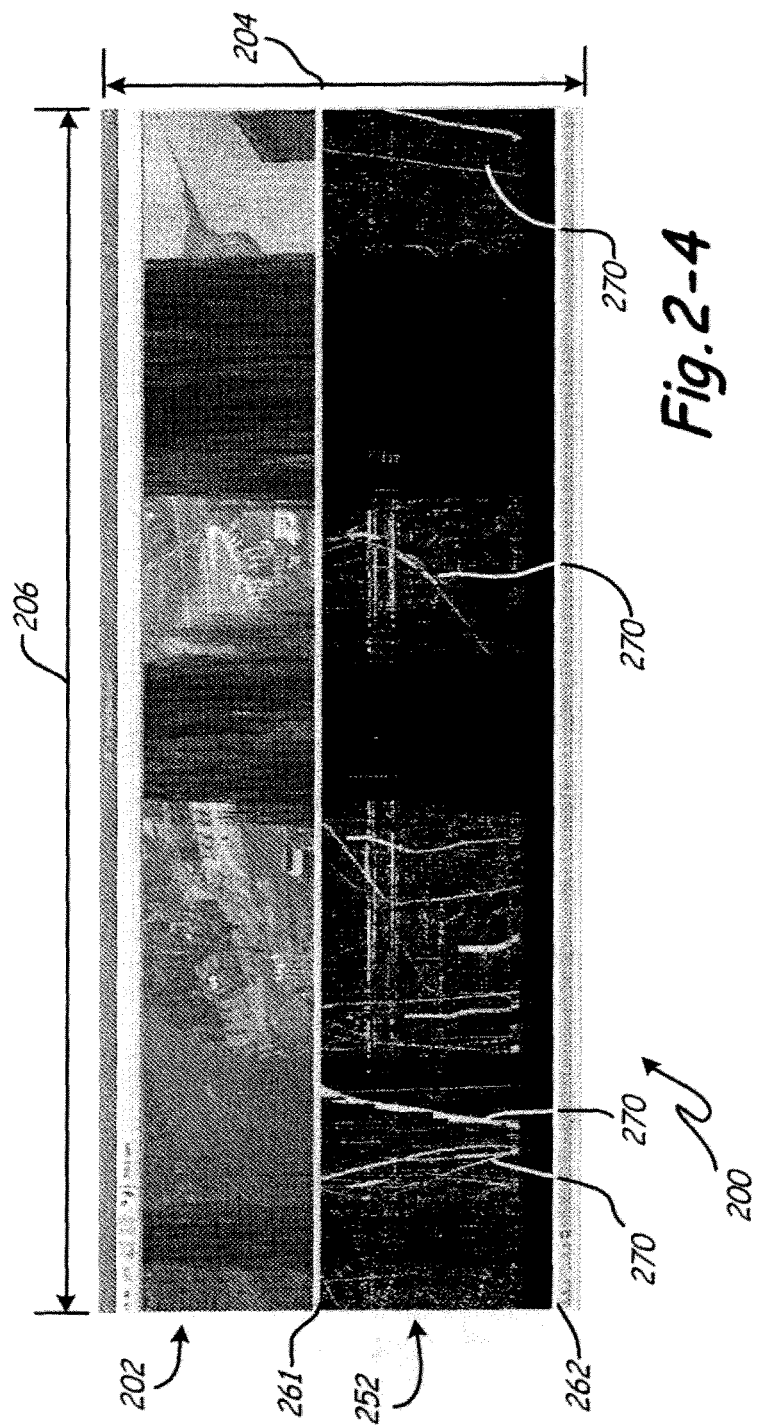

MOVING OBJECT DETECTION, TRACKING, AND DISPLAYING SYSTEMS

CROSS-REFERENCE TO RELATED CASE

The present application is continuation of and claims priority from U.S. patent application Ser. No. 12/908,281, which claims the benefit of U.S. provisional patent application Ser. No. 61/265,156, filed Nov. 30, 2009, the contents of which are hereby incorporated by reference in their entirety.

BACKGROUND

Many situations exist in which it may be useful or desirable to be able to detect and track moving objects. Two examples of such situations include security and surveillance applications such as for border or port security.

Moving object detection and tracking has historically been a relatively labor intensive process. Human operators would commonly have to diligently watch an area. The required attention could limit the amount operators can effectively observe.

Some semi-automated systems have been developed to aid operators in security and surveillance applications. One system includes highlighting a moving object by overlaying a box around the moving object in the original image. Some systems have also included showing a "tail" in the original image that provides an indication of a past location of the object.

SUMMARY

An alert and tracking system implemented on a computing device with a processor is presented. The system comprises a display with a viewing portion and a raster portion comprising a plurality of rasters. The system also comprises an image receiver configured to receive a first image and a second image, wherein the first image is received before the second image is received. The system also comprises a processing unit. The processing unit is configured to receive the second image. The processing unit is also configured to compare the second image to the first image. The processing unit is also configured to detect a change between the second image and the first image, wherein the detected change is indicative a moving object. The processing unit is also configured to update the viewing portion to display the second image. The processing unit is also configured to update the raster portion, wherein updating the raster image comprises adding a new raster to the plurality of rasters, wherein the new raster comprises a row of pixels corresponding to a compressed view of the image.

These and various other features and advantages that characterize the claimed embodiments will become apparent upon reading the following detailed description and upon reviewing the associated drawings.

BRIEF DESCRIPTION OF THE DRAWINGS

FIGS. 2-1, 2-2, 2-3, and 2-4 are screenshots that illustrate an alert and tracking window being populated with data over time.

FIG. 3 is a screenshot of a graphical user interface having zoom windows.

FIG. 4 is a block diagram of an operating environment that may be used to implement moving object detection, tracking, and displaying systems.

DETAILED DESCRIPTION

Embodiments of the present disclosure include systems and methods for detecting, tracking, and displaying moving objects. One notable feature of certain embodiments is an alert and tracking window. Alert and tracking windows are illustratively placed below or near a video display of the area being monitored. In at least certain situations, alert and tracking windows aid operators in quickly and effectively detecting and tracking moving objects. Alert and tracking windows may include tracking markers that provide an indication of past locations, direction of travel, speed, and relative size of moving objects. These features may permit operators to observe a larger area than they otherwise could. Also, as is discussed below in greater detail, some embodiments may also provide additional benefits and advantages such as, but not limited to, reducing costs, enhancing operator sensitivity in identification of moving objects, and helping operators distinguish between moving objects of interest (e.g. a boat) and clutter or noise (e.g. a tree with branches or leaves moving in the wind).

Figure 1:
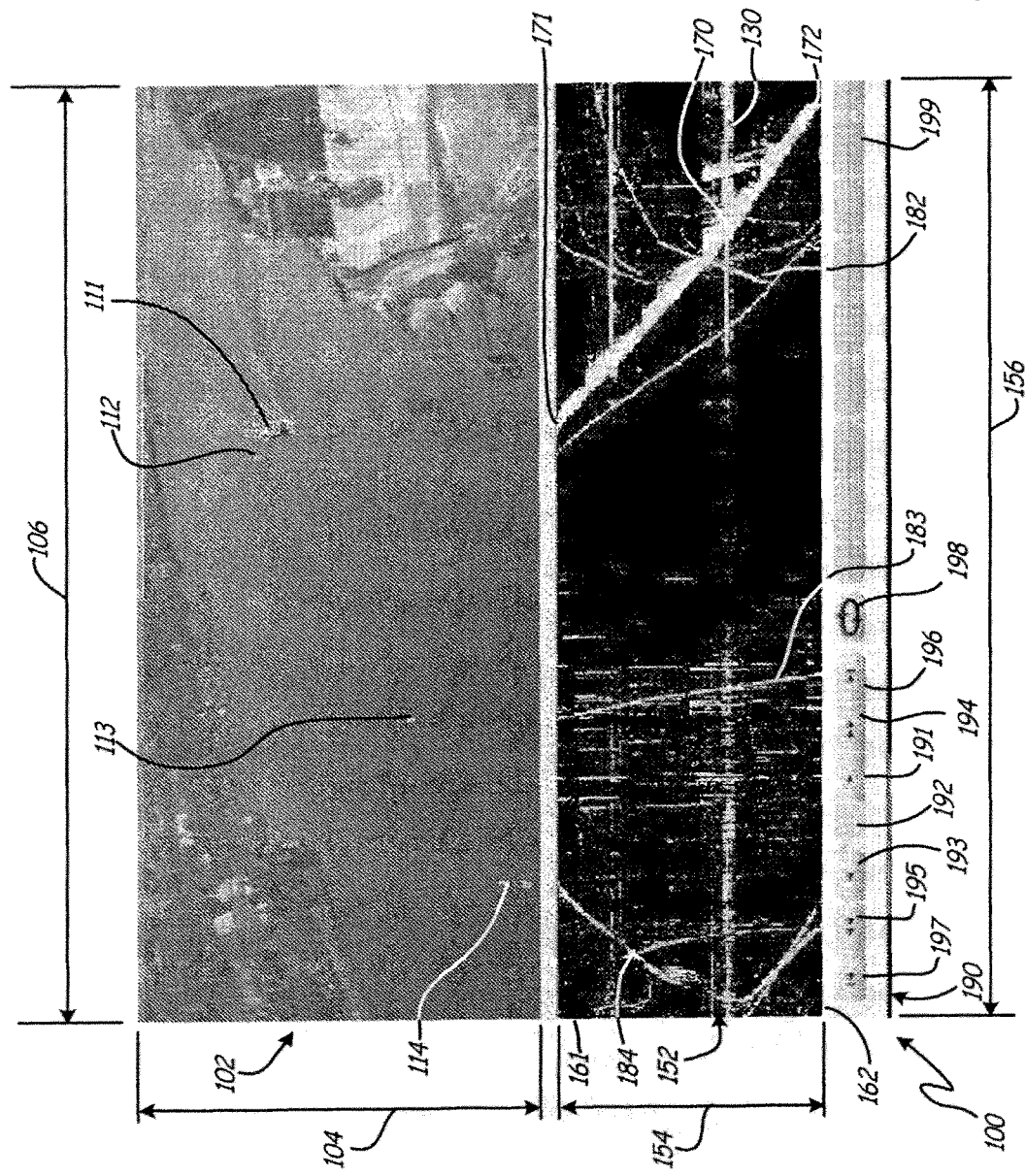
FIG. 1 is a screenshot of a moving object detection and tracking graphical user interface.

FIG. 1 is a screenshot of a moving object detection and tracking graphical user interface ("GUI") 100. GUI 100 is illustratively shown on a display device and monitored by one or more operators. It includes a video window 102 and an alert and tracking window 152. Video window 102 illustratively shows real-time or approximately real-time video of an area being monitored. Window 102 includes a height or vertical dimension 104 and a width or horizontal dimension 106. Embodiments of the present disclosure are not limited to any particular dimensions 104 and 106, and illustratively include any dimensions 104 and 106. Some examples of possible dimensions for illustration purposes only and not by limitation include "standard" video dimensions of 4:3 or 16:9 and panoramic dimensions such as, but not limited to, 108:7. Video window 102 similarly also optionally includes any number of pixels in its horizontal and vertical directions.

Video window 102 illustratively includes target detection highlights. Target detection highlights are graphical features overlaid on top of the video that indicate that an object shown in the video is moving. In the specific example shown in FIG. 1, the target detection highlights include colored squares that are placed around boats 111, 112, 113, and 114. Target detection highlights are not however limited to any particular configuration and optionally include any implementation such as circles, dots, change of shading or coloring, added graphical figures overlaid around or near the moving objects (e.g. boxes), etc. In one embodiment, target detection highlights only depict the current location of a moving object. However, in another embodiment, target detection highlights may depict both the current and past locations within the video window. For example, past locations of a moving object are illustratively shown by a "tail." Each point in the tail represents a horizontal and a vertical coordinate of the moving object in the past. The intensities of the points along the tail are optionally decreased such that the more recent locations are brighter than older locations. In one specific example, intensities are decreased by ten percent for each refresh or update. This results in the ends of the "tails" (i.e. the oldest parts) eventually going away so that the video window does not become "cluttered" with "tails." Also, it should be noted that although several examples of target detection highlights have been described, that embodiments of the present disclosure are not limited to any particular manner of showing current and/or past locations within video windows and embodiments illustratively include any manner or method.

Alert and tracking window 152, as is shown in FIG. 1, is illustratively positioned beneath video window 102. Alert and tracking window 152 may however be optionally located at any other position relative to video window 102 such as above it, to its left or right sides, or at a diagonal. Alert and Tracking window 152 has a height or vertical dimension 154 and a width or horizontal dimension 156. Vertical dimension 154 illustratively corresponds to a temporal dimension, and horizontal dimension 156 illustratively corresponds to a spatial or geographical dimension.

Alert and tracking window 152 includes a number of rasters. Each raster illustratively runs along the entire width 156 of the window and has a height that is a fraction of the height 154 of the window. Each raster also illustratively includes a number of columns that are a fraction of the width of the raster. In one embodiment, the heights of the rasters and the widths of the columns are illustratively one pixel, but embodiments are not limited to any particular number of pixels or dimensions.

In an embodiment, each raster in alert and tracking window 152 corresponds to one video frame of the video being shown in video window 102. For instance, the raster at the top 161 of window 152 illustratively corresponds to the current video frame being displayed in video window 102, and the raster at the bottom 162 of window 152 corresponds to a video frame that has been previously shown in window 102. Embodiments are not however limited to a one-to-one correspondence between video frames and rasters in alert and tracking window 152. Rasters in alert and tracking window 152 may be generated at a fraction of the video frame rate. For instance, rows may be generated once for every ten video frames, once every one hundred video frame, or any other frequency. Additionally, the height 154 of window 152 is not limited to any particular dimension. Accordingly, window 152 illustratively has rasters that correspond to any number of previous video frames that may be desirable. For instance, for illustration purposes only and not by limitation, window 152 could be set-up to show information that corresponds to 10 minutes, 30 minutes, 1 hour, 2 hours, or any other length of time.

In one embodiment, the intensity of the highlighted pixels or areas in a raster is dependent upon the number of pixels or amount of area in the corresponding video window for which motion is detected. The intensity illustratively increases as the amount of detected motion increases. For example, a column in a raster corresponding to five pixels with detected motion is displayed brighter than a column in a raster only corresponding to three pixels with detected motion. Accordingly, in some embodiments, alert and tracking windows provide users with indications of sizes or at least relative sizes of moving objects. An indication of horizontal size is given by the number of highlighted columns in a raster, and an indication of vertical size is given by the intensity of the highlights within the columns.

The width 156 of alert and tracking window spatially corresponds to width 106 of video window 102. In the particular example shown in the figure, there is a one-to-one correspondence, but embodiments include any ratio of correspondence. In the example shown in FIG. 1, each column in a raster corresponds to the column of pixels vertically above it in video window 102. As an object shown in video window 102 is detected as moving, the area or pixels in the corresponding location in the alert and tracking window are highlighted. For instance, in FIG. 1, boat 111 is detected as moving. Accordingly, the corresponding area or pixels 171 along the horizontal direction of alert and tracking window 152 are highlighted. The figure similarly shows that areas or pixels corresponding to boats 112, 113, and 114 have similarly been highlighted. Other areas of alert and tracking window 152 have not been highlighted and this indicates that there has not been any motion detected in the corresponding area of video window 102.

In at least certain embodiments, alert and tracking windows include target tracking markers. Target tracking markers illustratively include highlighted pixels or areas of multiple rasters within an alert and tracking window. The target tracking markers correspond to detected moving objects shown in video window 102. In FIG. 1, alert and tracking window 152 includes a target tracking marker 170 that corresponds to boat 111. Target tracking marker 170 includes an ending or most recent portion 171 and a beginning or oldest portion 172. As was previously mentioned, the most recent portion 171 corresponds to the current location of boat 111 shown in video window 102. The oldest portion 172, as well as all of the other portions of target tracking marker 170, correspond to past locations of boat 111. Accordingly, target tracking marker 170 shows that boat 111 has been moving from the right hand side of video window 102 towards the left hand side of video window 102. The alert and tracking window shown in FIG. 1 also includes additional target tracking markers such as marker 182 that corresponds to boat 112, marker 183 that corresponds to boat 113, and marker 184 that corresponds to boat 114.

Before continuing to discuss additional features of embodiments of the present disclosure, it is worthwhile to highlight a few other benefits and possible advantages of features that have been discussed. One benefit of such a system is that it allows for operators to easily identify moving objects in video window 102. For instance, an operator walking up to video window 102 may not be able to easily discover that boat 112 is moving or even that boat 112 exists. However, alert and tracking window 152 provides target tracking marker 182 that is easily identifiable by an operator and clearly shows that there has been a history of motion. An operator can identify marker 182 and then look to the corresponding areas of video window 102 to find boat 112. The target tracking marker in this sense helps to narrow or reduce the amount of video window 102 that an operator needs to study to find boat 112.

Another benefit is that alert and tracking windows provide direction and historical location information. For instance, in FIG. 1, an operator may identify that boat 111 is moving. The operator may however have just discovered this fact and would not know where boat 111 has previously been. Target tracking marker 170 shows that boat 111 has been moving from right to left. The past location information may also be useful in predicting a moving objects current direction. For example, although boat 111 could change its direction, alert and tracking window 152 shows that boat 111 has been heading in more or less the same direction for a period of time, and thus there is a probability that boat 111 is currently still heading in that same direction.

Related to the location and direction information discussed above, another potential benefit is that alert and tracking windows may also provide relative speed information. For instance, if a target tracking marker is sloped such that it has a large angle separating it from being vertical (i.e.

as a target tracking marker becomes more horizontally oriented), this indicates that the object has moved across a larger distance in a shorter amount of time and is thus moving relatively quickly. Additionally, based on the speed information and the predicted directional information discussed previously, in one embodiment, systems are able to predict future locations of moving objects. These future locations can be shown for instance by extending a target tracking marker past a moving object's current location. Embodiments are not however limited to any particular method of communicating possible future locations.

One other benefit worth noting at this point is that certain embodiments may help operators distinguish between real moving objects of interest and objects that have been detected as having motion but that are not of interest (i.e. clutter or noise). For instance, an area being monitored may have an object such as a tree or a water wave that may intermittently move. Detection systems may detect this movement and highlight it in an alert and tracking window. The motion however in not being constant will only show up as an isolated highlight or mark in the alert and tracking window. These types of highlights in the window are distinguishable from the more or less solid or constant lines or trails of target tracking markers. Accordingly, even in systems that have motion clutter or noise, operators are able to identify objects of interest.

Another type of noise that may be present in a system is noise caused by camera or sensor instability. A camera could for instance be bumped or otherwise moved. As is explained later in greater detail, in one embodiment, movement is detected by comparing pixels. In such a system, any camera/sensor instability may show up as highlighted pixels/movement. One example of such highlighted pixels caused by camera instability is the white horizontal line 130 in FIG. 1. As can be seen in FIG. 1, a large portion of the raster at line 130 is highlighted. In other systems, camera/sensor instability could potentially lead to a false detection of a moving object of interest. However, in at least some systems having alert and tracking windows, such as window 152 in FIG. 1, operators are more readily able to distinguish between camera/sensor instability and a real object of interest. This is yet another benefit provided by certain embodiments.

Returning to describing features of FIG. 1, graphical user interface 100 optionally includes playback controls 190. As will be discussed later in greater detail, embodiments of GUI 100 are illustratively implemented with systems that have video data storage capability. In such systems, playback controls 190 allow a user to control the video. For instance, an operator may notice that the alert and tracking window includes a target tracking marker but that the object is no longer present in the most recent video frame. The user may wish to "rewind" the video to go back and watch the video when the target tracking marker was being generated. Playback controls 190 provide for such functionality. In the example shown in the figure, playback controls 190 include a play forward in real time button 191, a pause button 192, a play in reverse in real time button 193, a play forward in quicker than real time button 194, a play in reverse in quicker than real time button 195, a skip to the end of the recorded video button 196, a skip to the beginning of the recorded video button 197, a loop or repeat button to continually replay a user defined portion of the video button 198, and a time dimension scroll bar 199 that allows a user to select a portion of the time to playback. Embodiments are not however limited to the particular controls shown in FIG. 1 and include any variety of user actuable controls or other methods of controlling recorded video playback. Other controls included in some embodiments, for illustration purposes only and not by limitation, are provided to zoom, add notes or annotations, extract and save video clips, scroll spatially for wide or panoramic images, archive data and supplemental information, and to change contrast.

FIGS. 2-1, 2-2, 2-3, and 2-4 show additional embodiments of a graphical user interface 200 for moving object detection, tracking, and displaying. Similar to GUI 100 in FIG. 1, GUI 200 illustratively includes a video window 202 and an alert and tracking window 252. One notable difference between GUIs 100 and 200 is the aspect ratio. GUI 100 has more or less of a "standard" aspect ratio or field of view (i.e. common field of view for video capturing equipment). GUI 200 has a panoramic or wide area field of view. As can be seen in the figures, the width 206 of GUI 200 is many multiples of the height 204 of GUI 200. Embodiments of GUIs according to the present disclosure include any aspect ratios or field of views. However, it is worth noting that in at least some circumstances, some embodiments may be even more beneficial in the context of a wide area field of view GUI. For instance, without alert and tracking windows, it may be difficult for operators to monitor the large area being shown in video window 202. However, with alert and tracking windows, operators can easily identify moving objects of interest using the target tracking markers.

Figure 2:
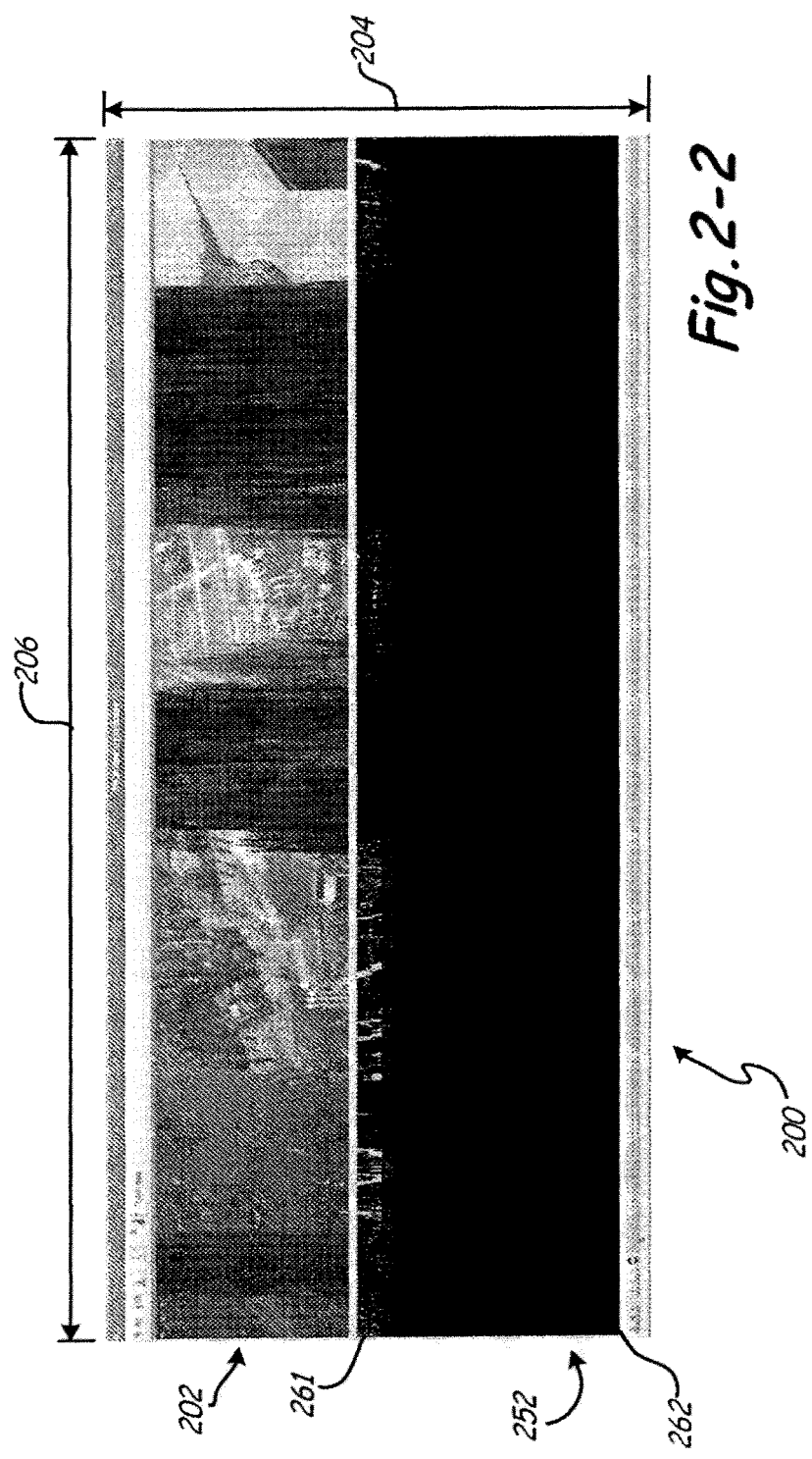

FIGS. 2-1, 2-2, 2-3, and 2-4 illustrate how an alert and tracking window is populated with or filled with data over time. FIG. 2-1 shows alert and tracking window 252 relatively soon after being started up. There is only a little bit of data being shown at the top 261 of the window. This is represented by the narrow line of highlighted pixels or areas towards top 261.

Figures 2, 3:
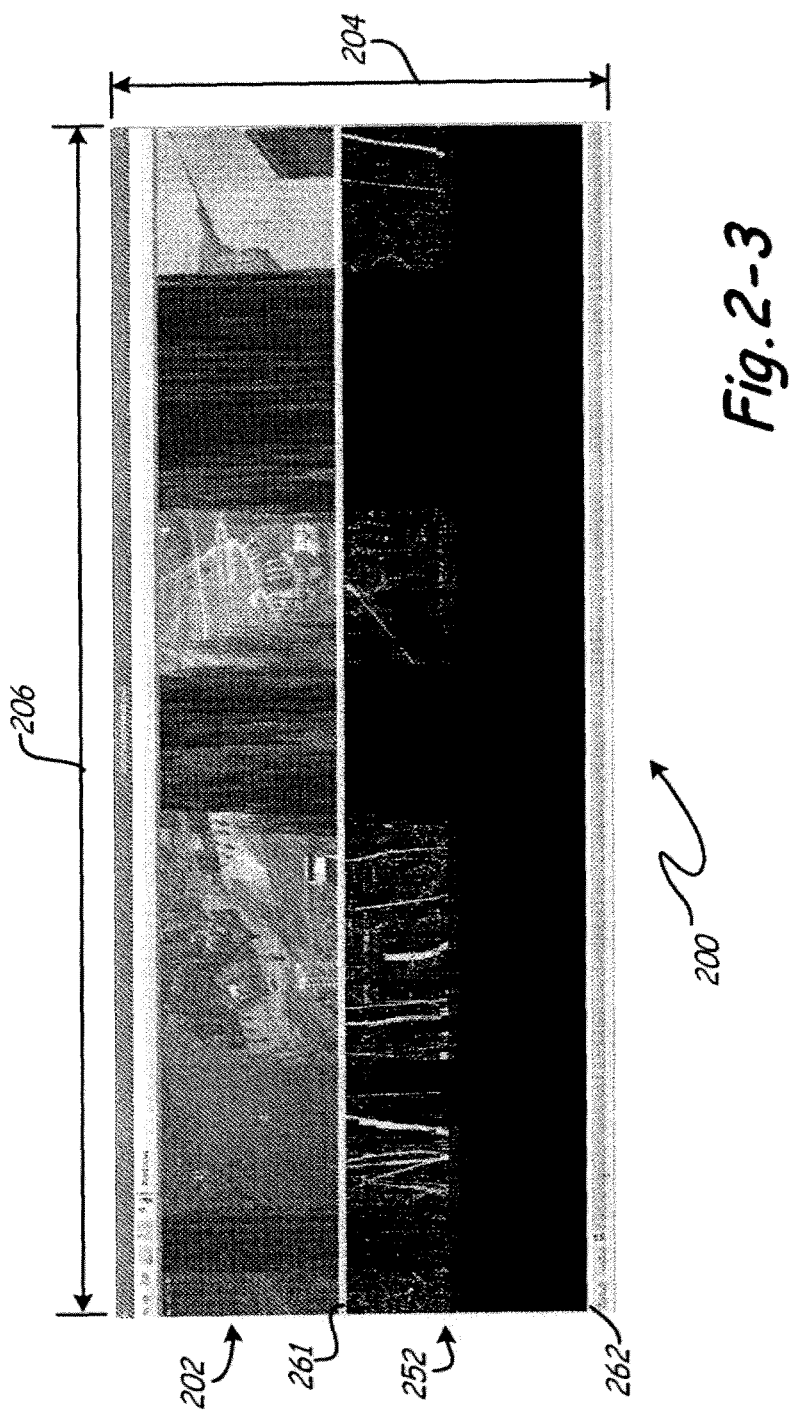
Figure 3:
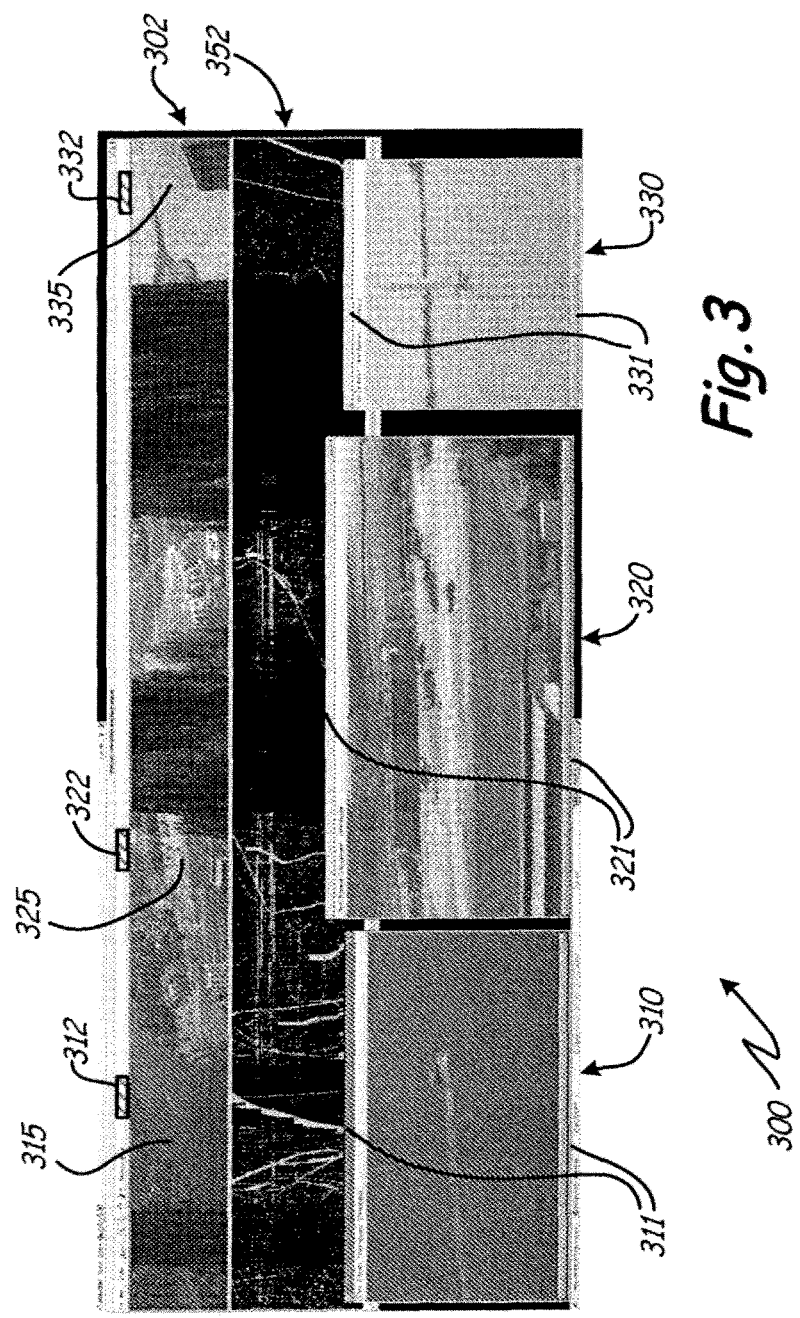
Figure 4:
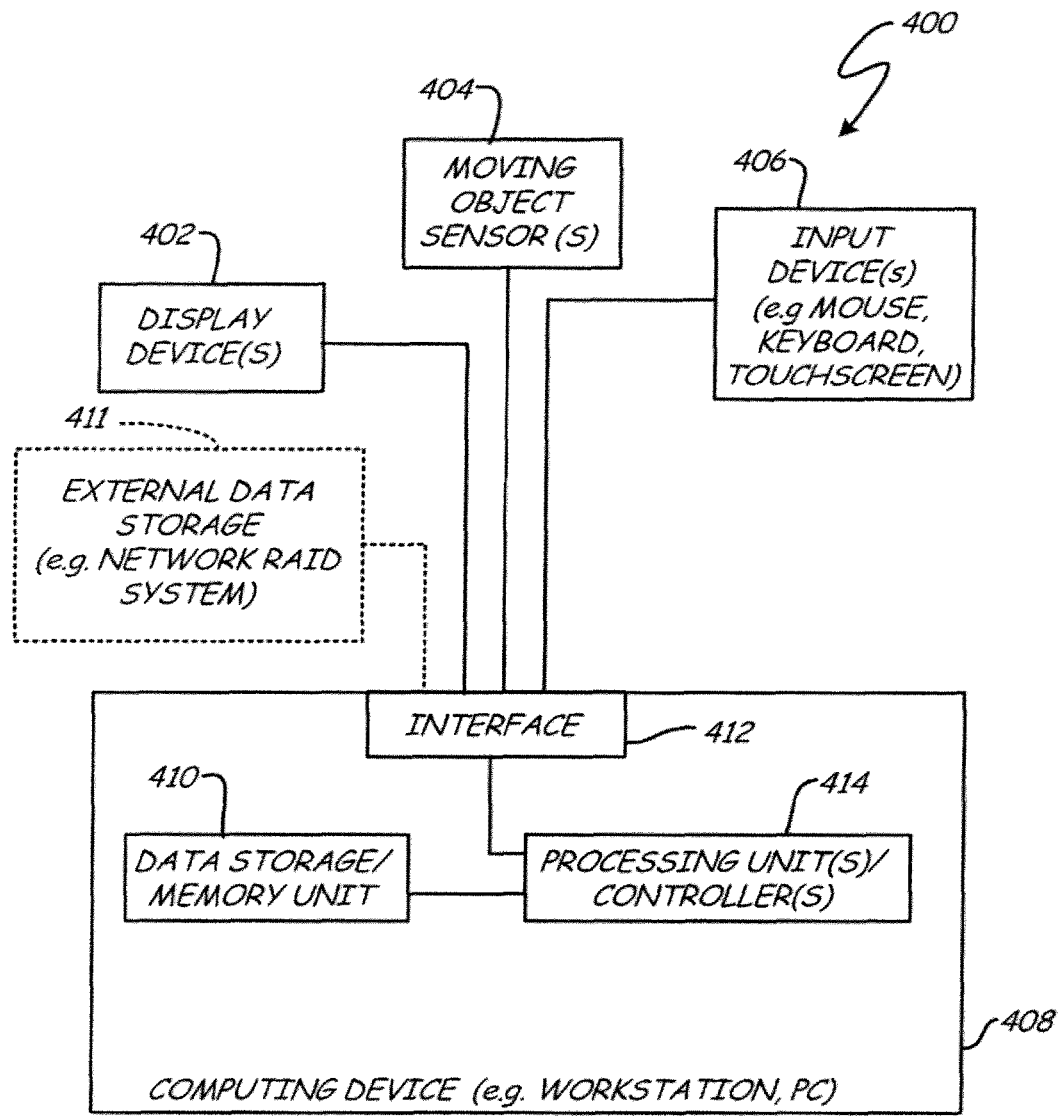

FIGS. 2-2, 2-3, and 2-4 then show alert and tracking window 252 progressively displaying more information as time passes. As can be seen in the figures, in going from FIG. 2-1 to FIG. 2-4, the area between top 261 and bottom 262 has progressively more highlights, including target tracking markers 270 of which four are labeled in FIG. 2-4. In the particular examples shown in the figures, FIG. 2-1 has 1 raster of data, FIG. 2-2 has 10 rasters of data, FIG. 2-3 has 50 rasters of data, and FIG. 2-4 has 100 rasters of data.

FIG. 3 is a screenshot of another embodiment of a graphical user interface 300 for moving object detection, tracking, and displaying. Like GUIs 100 and 200, GUI 300 includes a video window 302, and an alert and tracking window 352. GUI 300 also includes zoom window features that are optionally included in embodiments. In the example shown in the figure, GUI 300 includes zoom windows 310, 320, and 330. Zoom windows illustratively display a portion (i.e. a narrower field of view) of the video being shown in video window 302. In an embodiment, users are able to select a moving object being shown in video window 302, and upon the selection, a corresponding zoom window with the moving object is generated and displayed on the GUI. For instance, in FIG. 3, zoom window 310 corresponds to moving object 315, zoom window 320 corresponds to moving object 325, and zoom window 330 corresponds to moving object 335. Zoom windows are alternatively displayed in either full resolution or with digital zoom. In an embodiment, a user is able to choose between full resolution or digital zoom, and able to alternate between the two (e.g. start at full resolution and then use digital zoom to zoom in on an object of interest).

In another embodiment, instead of zoom windows being generated based upon a user selecting a moving object shown in video window 302, zoom windows are alternatively automatically generated once an object is detected.

Zoom windows 310, 320, and 330 are for instance in an embodiment automatically generated by a software algorithm without a user manually clicking on any objects within video window 302. Furthermore, an automatic tracking function is optionally utilized to keep moving objects within zoom windows centered within their associated zoom windows.

As is shown in FIG. 3, multiple zoom windows are capable of being generated and displayed concurrently. FIG. 3 shows the three zoom windows 310, 320, and 330 being displayed simultaneously. Embodiments are not however limited to any particular number of zoom windows and may include none, one, or any number greater than one of zoom windows. One potential benefit of such a system is that it allows for multiple operators to simultaneously and separately conduct detailed examination and manipulation of any portion of the total video image (e.g. view window 302) without interference among those separate operations. This may be useful for example to support situational awareness over large areas such as for border or port security.

GUI 300 also optionally includes features that facilitate identification of which part of the video window 302 that each zoom window corresponds to. In the embodiment shown in FIG. 3, each zoom window has coded borders surrounding the zoom window and a corresponding coded zoom window location indicator above the video window 302. The coded zoom window location indicators are illustratively positioned vertically above the area in the video window 302 that includes the area shown in the zoom window. For example, zoom window 310 has borders 311 and a location indicator 312. Borders 311 and indictor 312 illustratively have the same color, shading, graphic, number, or any other type of coding such that operators are able to recognize which zoom window corresponds to which location indicator. Similarly, FIG. 3 also shows that zoom window 320 has borders 321 and location indicator 322, and zoom window 330 has borders 331 and location indicator 332. Each zoom window border and its corresponding location indicator are illustratively coded the same as each other but differently than any other border or location indicator being displayed concurrently. It is worth noting that although some embodiments include the features described above, other methods of correlating zoom windows to specific portions of video windows exist, and embodiments are not limited to any particular method or set of features.

Zoom window borders may also include other features to aid operators in performing security and/or surveillance operations. In one embodiment, borders such as borders 311, 321, and 331 include horizontal and/or vertical scrollbars. The scrollbars allow operators to change the part of the larger image (i.e. the image shown in window 302) that is being displayed in the zoom window. An operator could for example change the zoom window to be showing an area to the left, right, above, and/or below the current area being shown. In another embodiment, borders also have interface elements that allow operators to quickly change the level of magnification of the zoom window (i.e. an operator can zoom in or zoom out on an area). It should be noted however that embodiments are not however limited to the specific examples described above and illustratively include any mechanisms for scrolling and zooming. For instance, for illustration purposes only and not by limitation, scrolling and zooming capabilities could be implemented utilizing keyboard strokes or mouse buttons.

FIG. 4 is one example of an operating environment 400 in which some embodiments may be incorporated in. Embodiments are not however limited to any particular operating environment and are illustratively incorporated in any number of operating environments. Operating environment 400 includes display device 402, moving object sensor 404, input device 406, and a computing device 408. Graphical user interfaces such as those shown in FIGS. 1, 2-1, 2-2, 2-3, 2-4, and 3 are illustratively displayed on display device 402. In an embodiment, multiple display devices are used to display GUIs. For instance, in an embodiment in which the video is wide area view video, multiple display devices may be used to show the entire image.

Users illustratively interact with the GUI on display device 402 using input device 406. Input device 406 may be one or more devices. Some examples of potential input devices include keyboards, mice, scroll balls, and touch screens. Embodiments are not however limited to any particular type of input devices and illustratively include any type of input device.

Operating environment 400 collects information to detect moving objects utilizing moving object sensor 404. In the examples described above, the information that has been collected has been shown as being video from a camera. Embodiments of the present disclosure are not however limited to only sensors that are cameras. Embodiments include any type of sensor that is able to collect information that may be utilized in detecting moving objects. For example, embodiments of sensors 104 include any imaging sensor that is responsive to different types of radiation. Some possible types of sensors, for illustration purposes only and not by limitation, include electro-optic, infrared, radar, magnetic, seismic, and acoustic.

Computing device 408 is illustratively communicatively coupled to moving object sensor 404, display device 402, and input device 406 through its interface 412. Computing device 408 includes memory unit 410 and processing unit 414. Memory unit 410 illustratively stores information or data collected by sensor 404. The stored information can be used for any of a great variety of applications such as, but not limited to, reviewing previously recorded/collected data. In one embodiment, playback controls such as playback controls 190 in FIG. 1 are used to select which information is chosen for playback and how it will be played back (e.g. full-speed, slow motion, etc.). Memory unit 410 also illustratively includes computer executable instructions that generate the GUIs and provide the other features in the above described embodiments. Memory unit 410 may include any type of memory such as, but not limited to, hard disk drives, solid state drives, flash memory, RAM, etc. In some embodiments, memory unit 410 includes more than one type of memory. For instance, sensor data may be stored to a hard disk drive and the computer executable instructions may be stored on a SSD.

In another embodiment, operating environment 400 optionally includes external data storage 411 in place of or in addition to data storage 410. External data storage 411 is not limited to any particular configuration or implementation. Certain embodiments include storage 411 being implemented as external hard disk drives, external solid state drives, and/or data storage capabilities implemented across a computer network (e.g. a RAID system accessed across a network). Accordingly, data may be stored and later reviewed independently from the operation of computing device 408. This may also be advantageous in providing data back-ups and possibly storing the sensor information in a more secure location.

Processing unit 414 illustratively executes instructions stored in memory unit 410 and controls the operations of operating environment 400. Processing unit 414 may include one or more types of devices such as, but not limited to, application-specific integrated circuits, field programmable gate arrays, general purpose microprocessors, video/graphic cards, etc. For instance, computing device 408 may include a microprocessor that processes software or firmware and multiple graphics cards to support multiple display devices 402.

Although embodiments are not limited to any particular configuration of operating environment 400, it is worth noting that in one embodiment that the environment is illustratively made of commercial off-the-shelf components. Or, in other words, the environment can be implemented without the need for any specialized hardware. This may be advantageous in that it may allow for at least some embodiments to have lower costs. Some examples, for illustration purposes only and not by limitation, of commercial off-the-shelf components that may be used include commercial workstation class computers capable of running software applications and hosting multiple graphic cards, commercial off-the-shelf graphic cards, standard computer control devices (e.g. keyboards and mice), and commercial off-the-shelf display monitors such as, but not limited to, flat panel color liquid crystal displays.

Figure 5:
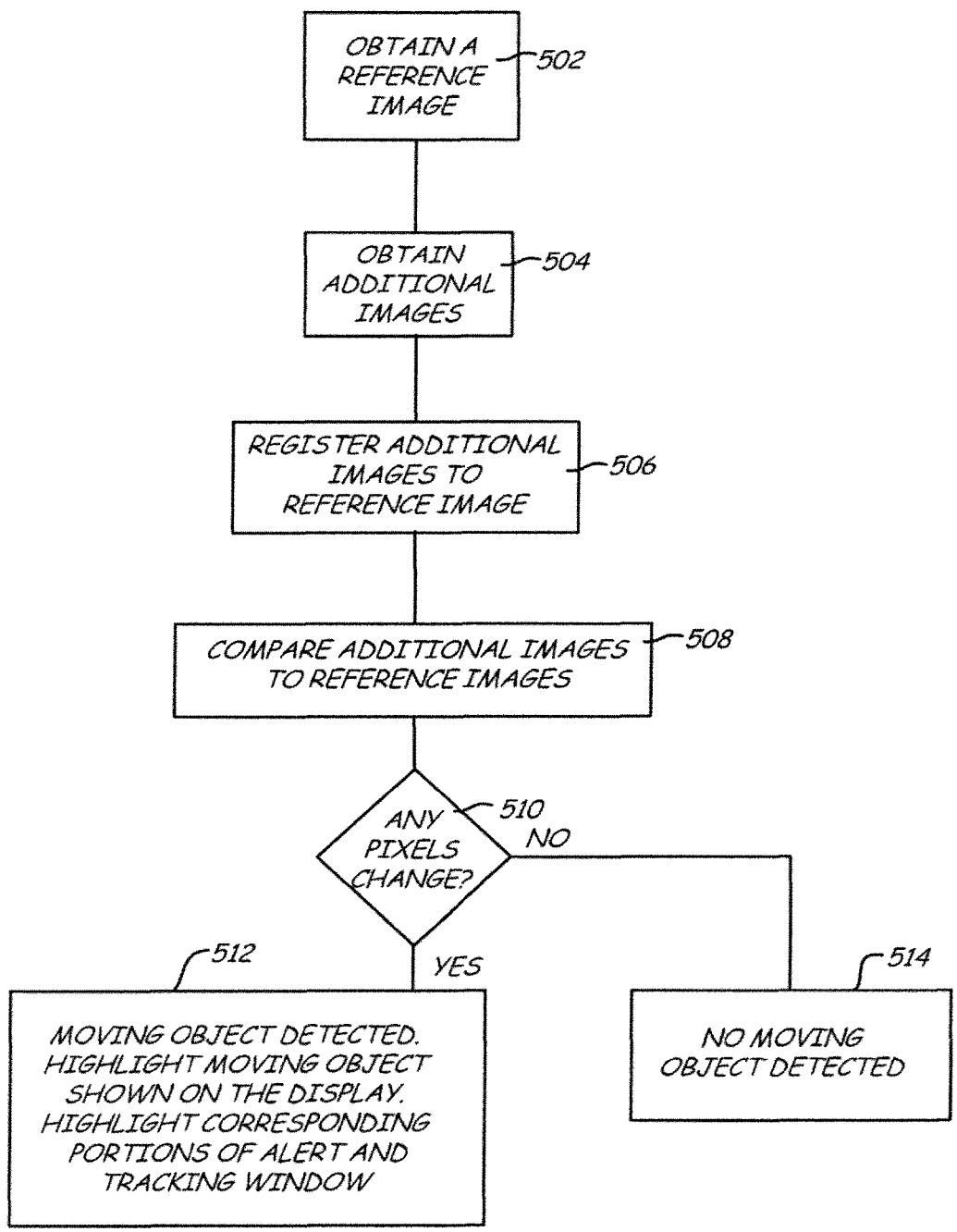
FIG. 5 is a process flow diagram of one method of detecting moving objects.

FIG. 5 is a process flow diagram of one method of detecting moving objects. The method shown in FIG. 5 may be used to implement the embodiments described above. Embodiments are not however limited to any particular method and illustratively utilize any method of detecting moving objects. Embodiments illustratively include algorithms or series of algorithms that detect and record any change in pixel characteristics above a predetermined threshold over time. The detected moving objects (i.e. the portions corresponding to pixels that have changed) are then highlighted or otherwise marked such that they are perceptible by operators.

Returning to FIG. 5, starting at block 502, a reference image is obtained. Additional images of the same area as the reference image are then obtained at block 504. At block 506, the additional images are registered or aligned to the reference image. The additional images may be registered successively one at a time or simultaneously. Additionally, the reference image may be periodically updated by using a new image as the reference image. Also, it is worth noting that the images need not be a single image from a sensor. In an embodiment, the images are computed images generated from multiple images of a sensor. For instance, multiple images from one camera may be joined together to form a panoramic view.

At block 508, the additional images are compared to the reference image. Moving objects illustratively correspond to pixels that have changed from the reference image. Embodiments are not limited to any particular method of change detection. Some examples of testing procedures that can be utilized to perform change detection operations include linear independence tests, vectorized tests, and edge motion tests. Further, the change detection can be performed by utilizing application specific information such as region of interest or known sizes or shapes. In one embodiment, a vector change detection algorithm is utilized. In this manner, a vector method is utilized that determines change at each image pixel (with respect to a reference image) based on a calculation using the test pixel and surrounding pixels in a square region (e.g. 3×3, 5×5, 7×7). In another embodiment, the spatial resolution of the change detection algorithm (the size of the square region) is utilized. The change detection operations may be performed simultaneously on multiple frames or performed on one frame at a time on a continuous basis.

At block 510, if one or more changes are detected, the method continues to block 512. At block 512, several optional events may be triggered upon a change detection. In one embodiment, the detected moving object shown on the display is highlighted. For instance, the image shown on the display is supplemented with a visual indicator (e.g. a box around the moving object). Additionally or alternatively, the portions of an alert and tracking window that correspond to the pixels in which change was detected are highlighted. In yet another embodiment, an audible or visual indicator is provided to alert operators of detected changes. Such indicators include, for illustration purposes only and not by limitation, an audio alarm or an indicator light.

Embodiments of the present disclosure may also include dedicated algorithms or series of algorithms to classify detected objects. For instance, embodiments illustratively identify an unknown object as a person, a vehicle, an animal, etc., and provide an indication of the classification to operators.

As has been described above, embodiments of the present disclosure include systems and methods for detecting, tracking and displaying moving objects. Embodiments may provide advantages such as ease of use, increased operator efficiency in detecting objects, and relatively lower costs to implement. Additionally, certain embodiments may include alert and tracking windows that are intuitively understood by operators and that provide additional information about detected objects that may not otherwise be available. For instance, alert and tracking windows may provide information about relative speed, size, past locations, and direction of travel. Accordingly, embodiments may be advantageous in a wide variety of situations such as, but not limited to, surveillance and/or security applications.

Finally, it is to be understood that even though numerous characteristics and advantages of various embodiments have been set forth in the foregoing description, together with details of the structure and function of various embodiments, this detailed description is illustrative only and changes may be made in detail, especially in matters of structure and arrangements of parts within the principles of the present disclosure to the full extent indicated by the broad general meaning of the terms in which the appended claims are expressed.

What is claimed is:

1. An alert and tracking system, implemented on a computing device with a processor, the system comprising:
   an image receiver configured to receive a first image comprising a first two-dimensional grid of portions and a second image comprising a second two-dimensional grid of portions, wherein the first image is received before the second image is received;
   a display comprising:
   a viewing window comprising a third two-dimensional grid of portions; and
   an alert and tracking window offset from the viewing window, the alert and tracking window comprising a fourth two-dimensional grid of portions wherein a first dimension of the fourth two-dimensional grid of portions is a first spatial dimension corresponding to a second spatial dimension of the third two-dimensional grid of portions; and wherein the processor is configured to:
  receive the first image and the second image;
  detect a change between the second image and the first image and identify a changed portion from one of the second two-dimensional grid of portions that contains the change, wherein the detected change is indicative of a moving object;
  update the viewing window to display the second two-dimensional grid of portions in the third two-dimensional grid of portions; and
  update the alert and tracking window to display a highlighted portion that spatially corresponds in one dimension to the changed portion displayed in the viewing window.

2. The system of claim 1, wherein the display further comprises a zoom portion configured to display a zoomed portion of the second image.

3. The system of claim 1, wherein updating the viewing window comprises highlighting the detected moving object.

4. The system of claim 1, wherein updating the viewing window comprises providing an indication of a past location of the detected moving object.

5. The system of claim 4, wherein the indication comprises displaying a plurality of past locations of the detected moving object.

6. The system of claim 4, wherein the indication comprises an indication of a speed of the detected moving object.

7. The system of claim 1, wherein the processing unit is configured to update the viewing window and the alert and tracking window in substantially real-time.

8. The system of claim 1, and further comprising:
  a storage component configured to store each of the first and second images.

9. The system of claim 8, wherein the processing unit is further configured to, based on the detected change, calculate a location of the detected moving object, wherein the location is stored in the storage component, and wherein the processing unit is further configured to allow a user to review the stored location information for the detected moving object.

10. The system of claim 1, wherein each of the first and second images are part of a video feed.

11. The alert and tracking system of claim 1, wherein the alert and tracking window comprises:
  a plurality of highlighted portions that spatially correspond in the one dimension to a number of past locations of the detected moving object, wherein the number of past locations are based on a first spatial resolution; and
  wherein the alert and tracking system comprises:
    a user actuatable mechanism that allows a user to change the first spatial resolution to a second spatial resolution.

12. A method of displaying movement of a detected object, the method comprising:
  receiving an image comprising an indication of the detected object;
  comparing the image to a previously-captured image;
  detecting, utilizing a processing component, a change, wherein the change comprises detecting that the detected object has moved between a first time, when the previously-captured image was taken, and a second time, when the image was taken;
  displaying an indication of the change, wherein displaying comprises generating a plurality of emphasized image portions and displaying the plurality of emphasized image portions in an alert and tracking window; and
  displaying the image in a viewing window that is offset from the alert and tracking window spatially in first direction along a first axis such that the plurality of emphasized image portions of the alert and tracking window substantially align with the indication of the detected object in the viewing window in a second axis that is perpendicular to the first axis.

13. The method of claim 12, wherein displaying the image in a viewing window also comprises displaying an indication of a past location of the detected object.

14. The method of claim 12, further comprising:
  displaying an indication of a previous change in the alert and tracking window that is offset from the plurality of emphasized image portions in a second direction that is opposite the first direction along the first axis.

15. The method of claim 12, wherein displaying the image in a viewing window also comprises displaying an indication of a projected future location of the detected object.

16. The method of claim 12, wherein the image comprises a frame of a video feed.

17. A tracking system comprising:
  a camera configured to capture an image of a moving object;
  a computing device with a processor configured to receive the image;
  the processor further configured to generate:
    a viewing window comprising the image, the viewing window having two spatial dimensions; and
    an alert and tracking window comprising an emphasis indication for the moving object in the image wherein the alert and tracking window is offset from the viewing window in a first direction and aligned with the viewing window in a second direction, such that the emphasis indication aligns with a location of the moving object in one of the two spatial dimensions; and
  wherein the processor displays the viewing window and alert tracking window on a display.

18. The system of claim 17, and further comprising:
  a data storage unit that stores a location of the moving object, calculated by the processor based on additional images of the moving object captured by the camera; and
  a playback controls that allow a user to review the stored location.

19. The system of claim 17, wherein the processor is configured to receive and analyze the image in substantially real-time.

20. The system of claim 17, wherein the camera is a video camera.

21. The system of claim 17, wherein the alert and tracking window and viewing window comprise different portions of a single display screen.

22. The system of claim 17, and further comprising a zoom portion.

* * * * *